United States Patent [19]
Mitsuya et al.

[11] 4,238,768
[45] Dec. 9, 1980

[54] PICTURE SIGNAL CODING APPARATUS
[75] Inventors: Eiji Mitsuya, Yokohama; Tomio Kishimoto, Yokosuka; Katsusuke Hoshida, Hoya, all of Japan
[73] Assignee: Nippon Telegraph and Telephone Public Corporation, Tokyo, Japan
[21] Appl. No.: 960,542
[22] Filed: Nov. 14, 1978
[30] Foreign Application Priority Data
Nov. 28, 1977 [JP] Japan ................. 52-142389
[51] Int. Cl.³ .................. H04N 7/12; G06K 9/00
[52] U.S. Cl. .................. 358/135; 358/138; 358/283; 364/515; 340/146.3 AQ
[58] Field of Search ............. 358/133, 135, 138, 141, 358/142, 260, 261, 283, 284, 282, 11, 12, 16, 166; 340/146.3 AQ; 364/515, 517

[56] References Cited
U.S. PATENT DOCUMENTS

| 3,723,649 | 3/1973 | Pitegoff et al. | 358/282 |
| 3,869,698 | 3/1975 | Trost et al. | 340/146.3 AG |
| 3,973,239 | 8/1976 | Kakumoto et al. | 340/146.3 AG |
| 4,064,484 | 12/1977 | Mese et al. | 340/146.3 AG |
| 4,196,452 | 4/1980 | Warren et al. | 358/283 |
| 4,196,453 | 4/1980 | Warren | 358/283 |
| 4,196,454 | 4/1980 | Warren | 358/283 |

OTHER PUBLICATIONS

T. E. Cassada and J. E. Garcia, Sep. 1973, "Facsimile Threshold with Background Control", IBM Technical Disclosure, vol. 16, No. 4.
M. L. Duff, "Gradient Detection System", IBM Technical Disclosure, vol. 18, No. 12, May 1976.

Primary Examiner—Robert L. Griffin
Assistant Examiner—Edward L. Coles
Attorney, Agent, or Firm—Pollock, Vande Sande and Priddy

[57] ABSTRACT

A frame of a gray-scaled picture is divided into blocks, in each of which the mean luminance of picture elements is used as a threshold value for comparison with each picture element signal to classify it into 0 or 1 according to its magnitude to provide a resolution component. From the resolution component and each picture element signal in the block are calculated two gray components; the resolution component and the two gray components are used as coded outputs for each block.

5 Claims, 13 Drawing Figures

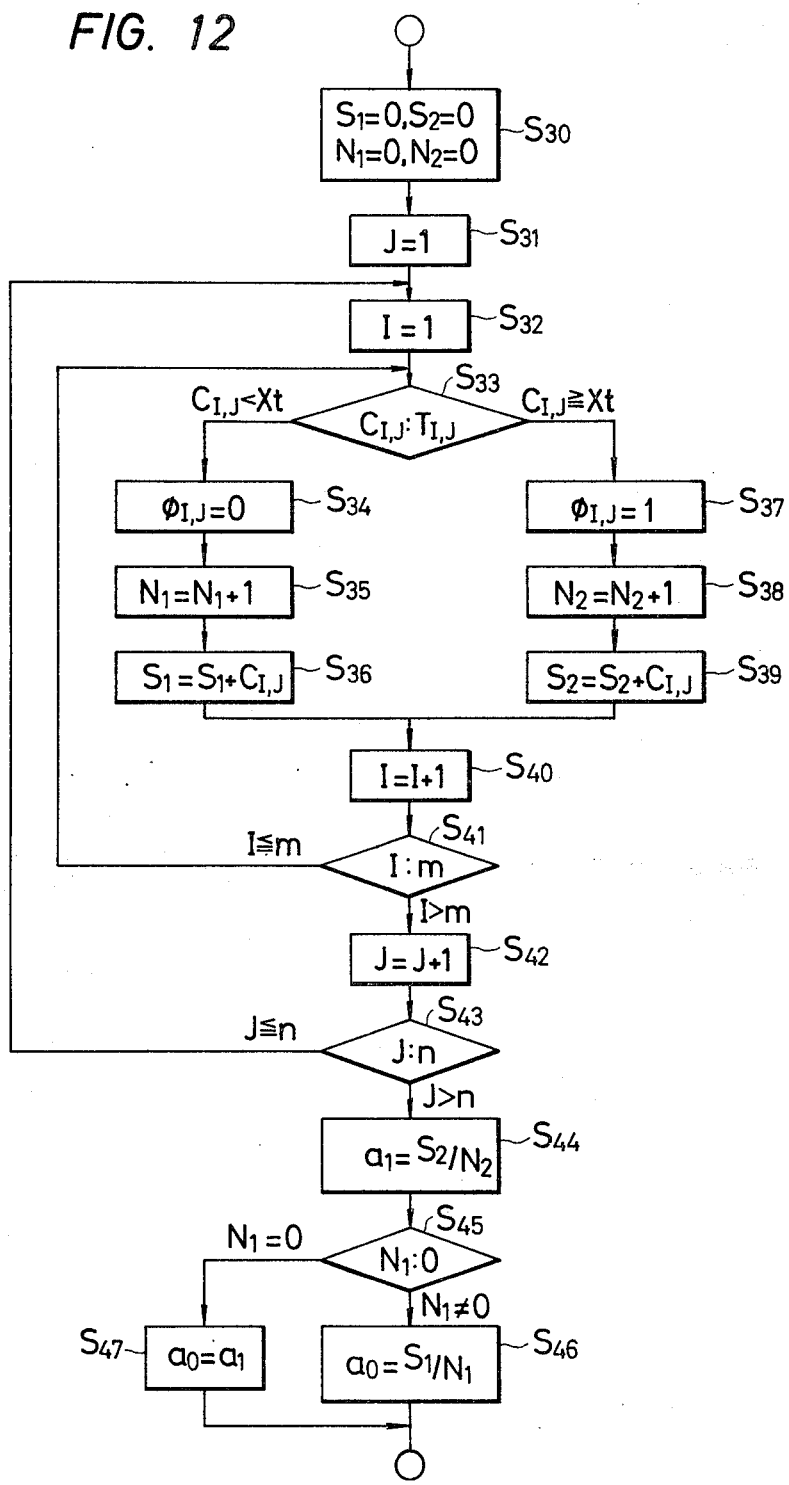

PICTURE SIGNAL CODING APPARATUS

BACKGROUND OF THE INVENTION

This invention relates to a picture signal coding apparatus which is of particular utility when employed in the coding of still pictures.

For the reduction of the cost of picture signal transmission, there have heretofore been proposed DPCM, $\Delta M$ and like coding systems, for example, in A. Habihi and G. S. Robinson "A Survey of Digital Picture Coding" Computer, 7,5, pp. 22-34 (May 1974). These known systems are called prediction coding systems, in which a prediction signal is produced based on a sample preceding a reference point and a prediction error signal which is a difference between a sample to be coded and the prediction signal is quantized for transmission. Due to the property of the picture signal, the prediction error signal occurs frequently in the range of which its amplitude is small, so that even if the prediction error signal is quantized roughly, the picture quality is not significantly deteriorated; therefore the number of bits necessary for coding can be reduced as compared with that in ordinary PCM in which a sample is coded as it is.

With these conventional prediction coding systems, however, the prediction error signal must be transmitted for every sample point, and the number of prediction error signal quantizing levels cannot be reduced significantly because of contributing factors to deterioration of the picture quality such as slope over load, granular noise, false contour, etc. For these reasons, the number of bits used is relatively large as a whole.

As a result of novelty search conducted by the European Patent Office, there was not found any particular prior literature corresponding to this invention but U.S. Pat. Nos. 3,403,226, 3,940,555 and 3,984,626 were cited as reference literatures. Now, a description will be given of U.S. Pat. No. 3,403,226 of the type in which a picture frame is divided into blocks. In this patent, one of the picture elements is selected as a typical picture element for each block and coded by the PCM technique so that it can represent, by itself, its level, and the difference between the typical picture element and each of the other picture elements of the same block is coded into a PCM code.

Accordingly, though the number of quantizing levels for the latter PCM code is smaller than that for the typical picture element, transmission of the PCM codes requires a plurality of bits, resulting in an appreciably large number of bits being needed as a whole.

An object of this invention is to provide a picture signal coding apparatus which enables coding with less bits than those used in the prior art.

SUMMARY OF THE INVENTION

According to this invention, a frame of a gray-scaled picture is divided into a plurality of blocks, and based on the statistical property of the luminance levels of picture elements in each block, the picture elements of the block are separated into gray components and resolution components, thereafter being coded. For instance, a threshold value is set in each block based on the luminance distribution therein, and the luminance level of each picture element is checked to determine whether it is higher or lower than the threshold value. From the check results and the luminance levels of the picture elements are obtained two typical luminance levels. For each block, the two typical luminance levels and the check results are transmitted in the form of codes. Letting $a_0$ and $a_1$ represent the typical luminance levels, $x_t$ represent the threshold value, $x_i$ represent the luminance level of each picture element, and $y_i$ represent the luminance level of the picture element after being converted by coding, decoding is achieved by the following conversion:

$$y_i = \phi_i a_0 + \overline{\phi_i} a_1$$

where when $x_i \geq x_t$, $\phi_i = 1$, where when $x_i < x_t$, $\phi_i = 0$, and where $\overline{\phi_i}$ is the complement of $\phi_i$. The typical luminance levels $a_0$ and $a_1$ are gray components, and $\phi_i$ is a resolution component.

The typical luminance levels $a_0$ and $a_1$ and the threshold value $x_t$ are determined, for example, in the following manner.

In accordance with a first method, a condition $x = y$ that mean luminance levels $x$ and $y$ of the picture elements in each block remain unchanged before and after coding, is given, and the mean luminance level of the picture elements in each block before coding is used as the threshold value $x_t$, namely, $x_t = x$, and the following mean square errors before and after conversion in each block $$\epsilon^2 = \frac{1}{N_0} \sum_{i}^{N_0} (x_i - y_i)^2$$

are minimized, whereby to obtain the typical luminance levels $a_0$ and $a_1$ and the threshold value $x_t$. That is, letting $x_i$ represent the luminance level of each picture element is each block, $N_0$ represent the number of picture elements in the block, $x$ represent the means luminance level of the picture elements in the block, $x_L$ represent the mean luminance level of the group of those picture elements whose luminance levels are lower than the mean luminance level $x$, $N_1$ represent the number of such picture elements, $x_H$ represent the mean luminance level of the group of those picture elements whose luminance levels are higher than the mean luminance level $x$ and $N_2$ represent the number of such picture elements, the mean luminance levels $x$, $x_L$ and $x_H$ are given as follows:

$$\overline{x} = \frac{\sum_{i}^{N_0} x_i}{N_0}$$

$$\overline{x_L} = \frac{\sum x_i \, (x_i < \overline{x})}{N_1}$$

$$\overline{x_H} = \frac{\sum x_i \, (x_i \geq \overline{x})}{N_2}$$

obtaining the condition that the mean square error powers $\epsilon_2$ for the typical luminance levels $a_0$ and $a_1$ are minimized, namely, $(\delta/\delta a_0)\epsilon^2 = 0$ and $(\delta/\delta a_1)\epsilon^2 = 0$, the typical luminance levels $a_0$ and $a_1$ are given as follows:

$$a_0 = \overline{x_L}$$

$$a_1 = \overline{x_H}$$

This method is referred to as the two average value method.

A second method is to obtain the typical luminance levels $a_0$ and $a_1$ and the threshold value $x_t$ from the abovesaid condition $\overline{x}=\overline{y}$, a condition $\overline{x^2}=\overline{y^2}$ that luminance powers $\overline{x^2}$ and $\overline{y^2}$ of the picture elements in the blocks before and after conversion remain unchanged before and after coding, and a condition $(\delta/\delta x_t)\epsilon^2=0$ that the mean error power becomes minimized in respect of the threshold value $x_t$. That is, letting $\overline{x_{L'}}$ represent the mean luminance level of the group of those picture elements whose luminance levels are lower than the threshold value, $N_1$ represents the number of such picture elements, $\overline{x_{H'}}$ represent the mean luminance level of the group of those picture elements whose luminance levels are higher than the threshold value, $N_2$ represent the number of such picture elements, $\overline{x}$ represent the mean luminance level of picture elements in each block before coding and $\delta^2$ represent variance of luminance levels of the picture elements, the means luminance levels $\overline{x_{L'}}$, $\overline{x_{H'}}$ and variance $\delta^2$ are given as follows:

$$\overline{x_{L'}} = \frac{\sum x_i \ (x_i < x_t)}{N_1}$$

$$\overline{x_{H'}} = \frac{\sum x_i \ (x_i \geq x_t)}{N_2}$$

$$\delta^2 = \frac{1}{N_0} \sum_i^{N_0} (x_i - \overline{x})^2$$

The threshold value $x_t$ is given as follows:

$$x_t = \tfrac{1}{2} (\overline{x_{L'}} + \overline{x_{H'}})$$

The typical luminance levels $a_0$ and $a_1$ are given as follows:

$$a_0 = \overline{x} - \sqrt{\frac{N_2}{N_1}} \delta, \ a_1 = \overline{x} + \sqrt{\frac{N_1}{N_2}} \delta$$

This method is referred to as the variance method.

In the case of this method, if it were supposed $x_t=\overline{x}$ so as to simplify the process of obtaining the threshold value $x_t$, the mean square error $\epsilon^2$ is not always minimized, but the typical luminance levels $a_0$ and $a_1$ are the same as those obtainable in the above.

A third method is to simultaneously satisfy the conditions $$\overline{x} = \overline{y}, \ \frac{\partial}{\partial a_0} \epsilon^2 = 0, \ \frac{\partial}{\partial a_1} \epsilon^2 = 0 \text{ and } \frac{\partial}{\partial x_t} \epsilon^2 = 0$$

utilized in the first and second methods. In this instance, the threshold value $x_t$ is expressed as follows:

$$x_t = \tfrac{1}{2} (\overline{x_{L'}} + \overline{x_{H'}})$$

and the typical luminance levels $a_0$ and $a_1$ are as follows:

$$a_0 = \sum_{x_i < x_t} \frac{x_i}{N_1}$$

$$a_1 = \sum_{x_i \geq x_t} \frac{x_i}{N_2}$$

This method is referred to as the variable threshold method.

Thus, in this invention, there are transmitted the typical luminance levels $a_0$ and $a_1$ in each block and the resolution component indicative of the level $a_0$ or $a_1$ at which each picture element is to be decoded. In other words, for each picture element, information "1" or "0" is transmitted, and for each block, the typical luminance levels $a_0$ and $a_1$ of the block are transmitted. Accordingly, the number of bits used is markedly reduced as a whole, and in addition, since the picture frame is divided into blocks, excellent picture reconstruction can be achieved.

BRIEF DESCRIPTION OF THE DRAWINGS

FIG. 12 is a flowchart showing a resolution component discriminating routine and a typical luminance level calculating routine.

DESCRIPTION OF THE PREFERRED EMBODIMENTS

Figure 1:
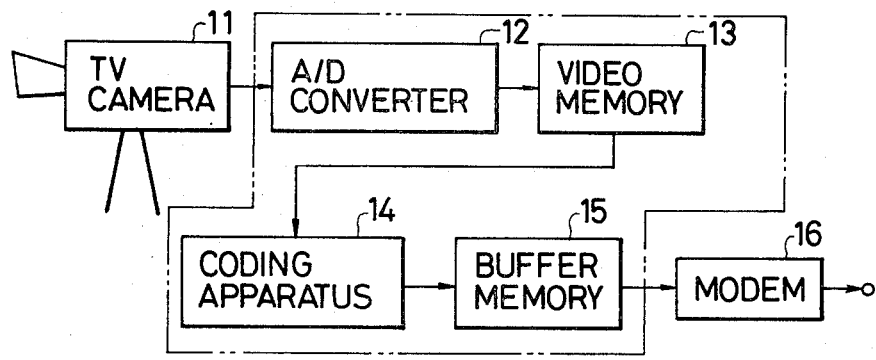
FIG. 1 is a block diagram illustrating an embodiment of the picture signal coding apparatus according to this invention.
Figure 2:
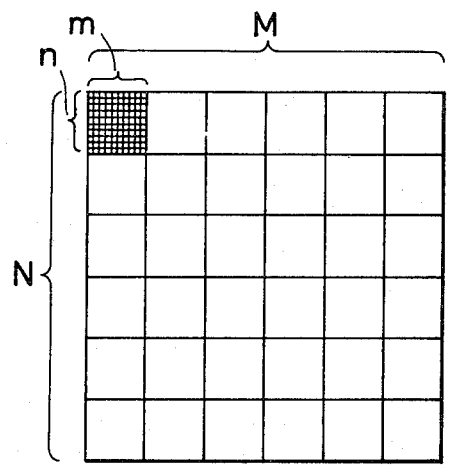
FIG. 2 is a diagram showing an example of a picture divided into blocks.

Referring now to FIG. 1, a picture signal picked up by a TV camera 11 is quantized by an analog-to-digital converter 12 for each picture element, thereafter being stored in a video memory 13. The picture picked up by the TV camera 11 is divided into, for instance, $N \times M$ blocks, as depicted in FIG. 2, and each block is composed of $n \times m$ picture elements. The picture signal stored in the video memory 13 is read in a coding apparatus 14 for each block.

Letting $x_i$ represent the luminance level of each picture element in the block, the luminance level $x_i$ is converted by the coding apparatus 14 to $y_i$ in the following process:

$$y_i = \phi_i \cdot a_1 + \overline{\phi_i} \cdot a_0$$

where when $x_i \geq x_t$, $\phi_i = 1$ and $\overline{\phi_i} = 0$, and when $x_i < x_t$, $\phi_i = 0$ and $\overline{\phi_i} = 1$. The values $x_t$, $a_0$ and $a_1$ are obtained from the distribution of luminance levels of the picture elements in the block by one of the three methods described previously. By the coding apparatus 14, picture information in the block is converted to gray components $a_0$ and $a_1$ and resolution components ($\phi_0$, $\phi_1$, ... $\phi_q$) (q=m×n). These converted codes are stored in a buffer memory 15, from which they are read out thereof at a constant speed suitable to a transmission line and provided thereon via a modem 16.

Figure 3:
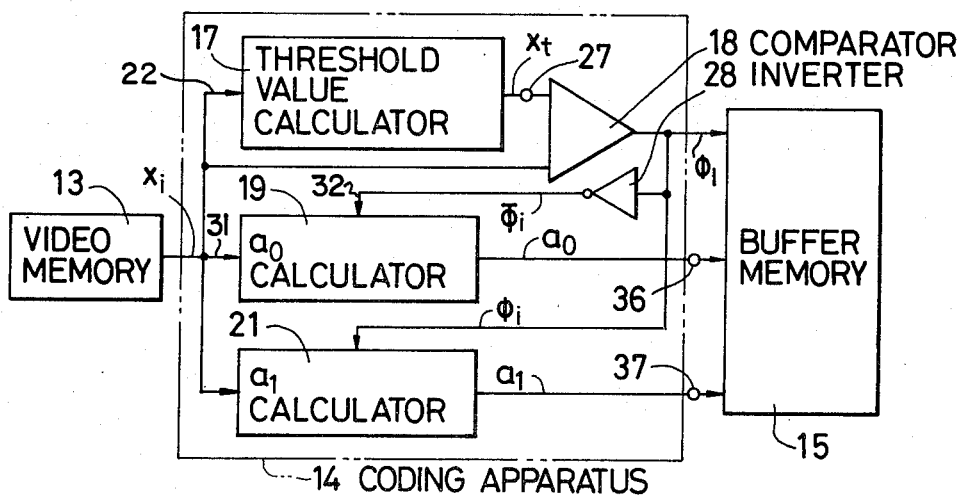
FIG. 3 is a block diagram illustrating an example of a coding apparatus 14 utilized in FIG. 1.
Figure 4:
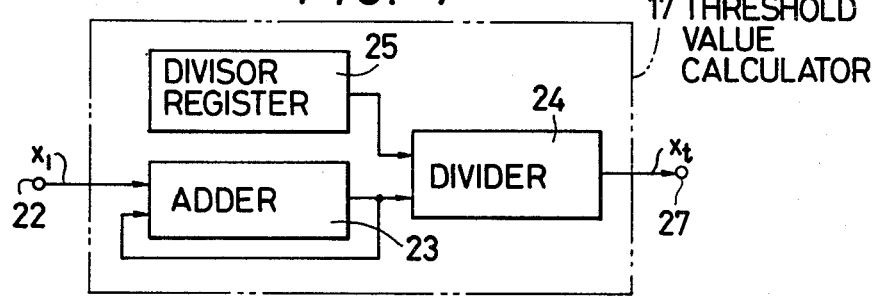
FIG. 4 is a block diagram showing an example of a threshold value calculator 17 used in FIG. 3.

The coding apparatus 14 is constructed, for example, as illustrated in FIG. 3. The output from the video memory 13 is applied to a threshold value calculator 17, one input terminal of a comparator 18, an $a_0$ calculator 19 and an $a_1$ calculator 21, respectively. In the threshold value calculator 17, for example, as shown in FIG. 4, the picture element signals applied via a terminal 22 from the video memory 13 are sequentially accumulated in an adder 23, the initial value of which is reset at zero. Upon completion of addition of all the picture elements of the block, the output from the adder 23 is provided to a dividend input terminal of a divider 24, in which the input thereto is divided by a divisor stored in a divisor register 25. The value of the divisor is the number of all picture elements of the block m×n, and is preset. In this manner, the mean luminance level value $\overline{x}$ of the picture elements in the block is derived as the threshold value $x_t$ at a terminal 27.

The threshold value $x_t$ thus obtained is applied to the other input terminal of the comparator 18 in FIG. 3. The comparator 18 compares the luminance level $x_i$ of each picture element with the threshold value $x_t$ to provide the resolution component ($\phi_i$) to the buffer memory 15. The compared output $\phi_i$ and its inverted output $\overline{\phi_i}$ from an inverter 28 is applied to the $a_1$ calculator 21 and the $a_0$ calculator 19, respectively, to obtain the gray components $a_0$ and $a_1$.

Figure 5:
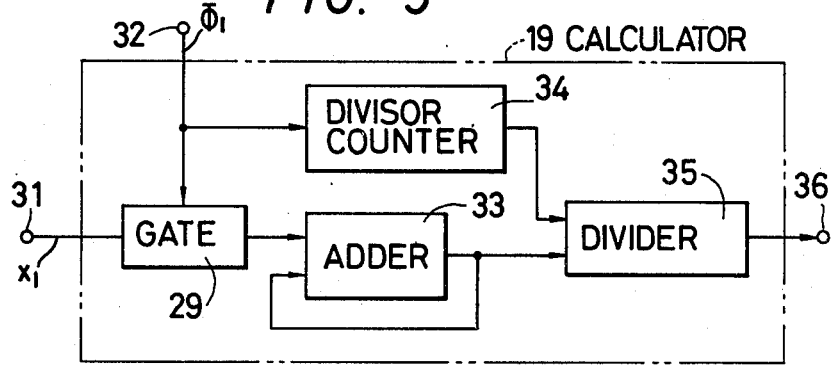
FIG. 5 is a block diagram showing an example of an $a_0$ calculator 19 utilized in FIG. 3.

In the $a_0$ calculator 19, for example, as depicted in FIG. 5, the picture element signals $x_i$ from the video memory 13 are supplied via a terminal 31 to a gate 29. The resolution component $\overline{\phi_i}$ from the inverter 28 is also applied as a control signal to the gate 29 via a terminal 32. The gate 29 is opened or closed depending upon whether the resolution component $\overline{\phi_i}$ is 1 or 0. Accordingly, in the case where $x_i < x_t$, namely, $\overline{\phi_i} = 1$, the picture element signals are accumulated in an adder 33 via the gate 29. Thus, all picture elements in the block that $x_i < x_t$ are added together in the adder 33.

The number of the gate control signals $\overline{\phi_i}$ at the terminal 32 in this case is counted by a divisor counter 34 to obtain the number $N_1$ of the picture elements that $x_i < x_t$ for each block. The divider 35 divides the added result $$\sum x_i \quad (x_i < x_t)$$

of the adder 33 by the picture element number $N_1$ stored in the divisor counter 34, providing the gray component $a_0$ at a terminal 36. The $a_1$ calculator 21 in FIG. 3 is identical in construction with the $a_0$ calculator 19 and produces the gray component $a_1$ at a terminal 37. The gray components $a_0$ and $a_1$ thus obtained are stored in the buffer memory 15 at suitable timings.

Figure 6:
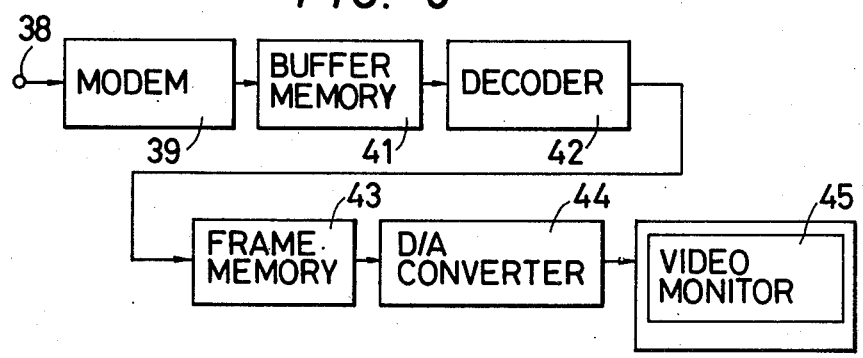
FIG. 6 is a block diagram illustrating an example of a decoding apparatus for decoding a coded signal from the coding apparatus of this invention.

The picture signal coded, as described above, is decoded in the following manner. For instance, as shown in FIG. 6, the coded picture signal applied via a terminal 38 from the transmission line is received and demodulated by a modem 39. The demodulated signal is once stored in a buffer memory 41 and then supplied to a decoder 42, in which each picture element signal is decoded, thereafter being written in a frame memory 43. The content of the frame memory 43 is read out thereof and converted by a digital-to-analog converter 44 to an analog signal, which is reconstructed by a video monitor 45 into a picture.

Figure 7:
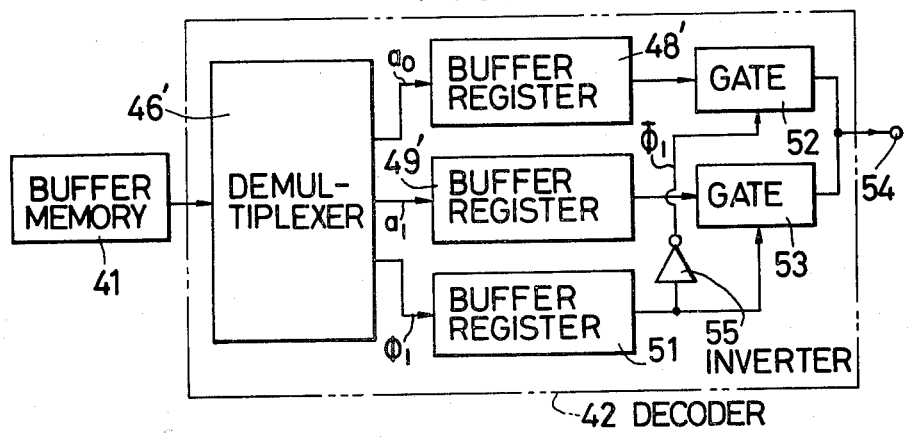
FIG. 7 is a block diagram showing an example of a decoder 42 used in FIG. 6.

The decoder 42 is constructed, as shown in FIG. 7. A demultiplexer 46' separates the signal from the buffer memory 41 into the gray components $a_0$ and $a_1$ and the resolution component $\phi_i$. The components $a_0$, $a_1$ and $\phi_i$ are transferred to buffer registers 48', 49' and 51, respectively. By the information $\phi_i$ from the buffer register 51, gates 52 and 53 are controlled to open or closed to permit the passage therethrough of either one of the information $a_0$ and $a_1$ stored in the buffer registers 48' and 49', providing at a terminal 54 the information as each picture element signal in the block. That is, when $\phi_i = 0$, i.e. $x_i < x_t$ on the transmitting side, the gate 52 is opened by the inverted output $\overline{\phi_i}$ from an inverter 55 to pass on the information $a_0$ in the buffer register 48' to the terminal 54, whereas when $\phi_i = 1$ i.e. $x_i \geq x_t$ on the transmitting side, the gate 53 is opened by the information $\phi_i$ to pass on the information $a_1$ in the buffer register 49' to the terminal 54. Though not shown, since the position of each picture element in each block is known, the output at the terminal 54 is written in the frame memory 43 at an address corresponding to the above-said position. When the picture element signals of all blocks have thus been decoded and decoded information of one frame has been stored in the frame memory 43, a still picture of one frame is reconstructed on the video monitor 45.

Figure 8:
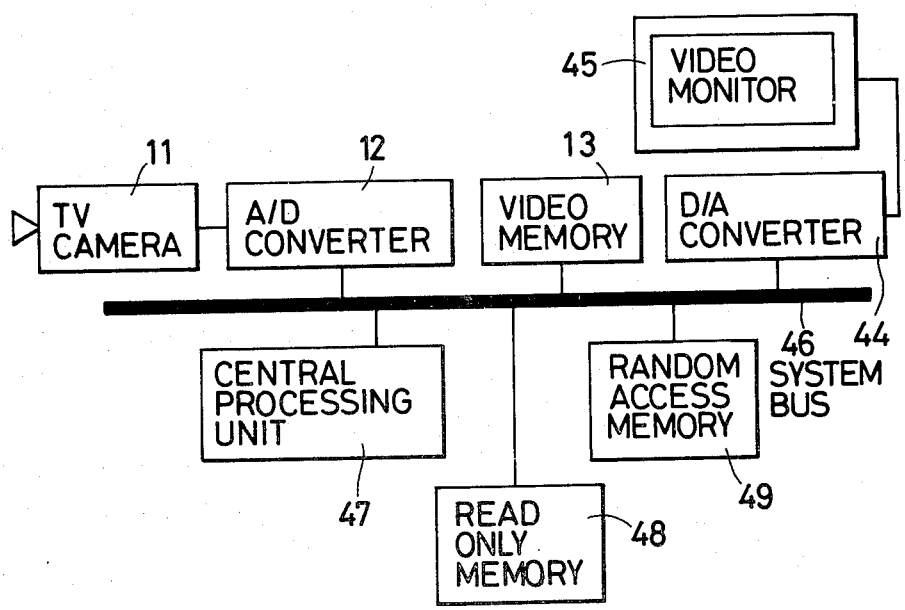
FIG. 8 is a block diagram showing another embodiment of coding apparatus of this invention which employs a microprocessor.

The coding and decoding described above can also be achieved by a stored program, using the so-called microcomputer. For example, as illustrated in FIG. 8, the output from the TV camera 11 is supplied to the analog-to-digital converter 12 for conversion into a digital signal, the output side of the analog-to-digital converter 12 being connected to a system bus 46. To the system bus 46 are also connected the video memory 13 and the digital-to-analog converter 44. Further, a central processing unit (CPU) 47, a read only memory (ROM) 48 and a random access memory (RAM) 49 are respectively connected to the system bus 46. The output side of the digital-to-analog converter 44 is connected to the video monitor 45.

The read only memory 48 stores therein a program for coding and decoding, and the central processing unit 47 sequentially reads out the program from the read only memory 48 and interprets and executes it, thereby to effect coding and decoding. The video memory 13 stores therein the output from the TV camera 11 in digital form or the decoded picture signal, and the stored content of the video memory 13 is read out thereof and converted by the digital-to-analog converter 44 to an analog signal for input to the video monitor 45. The random access memory 49 is utilized for temporarily storing data necessary for coding and decoding.

Figure 9:
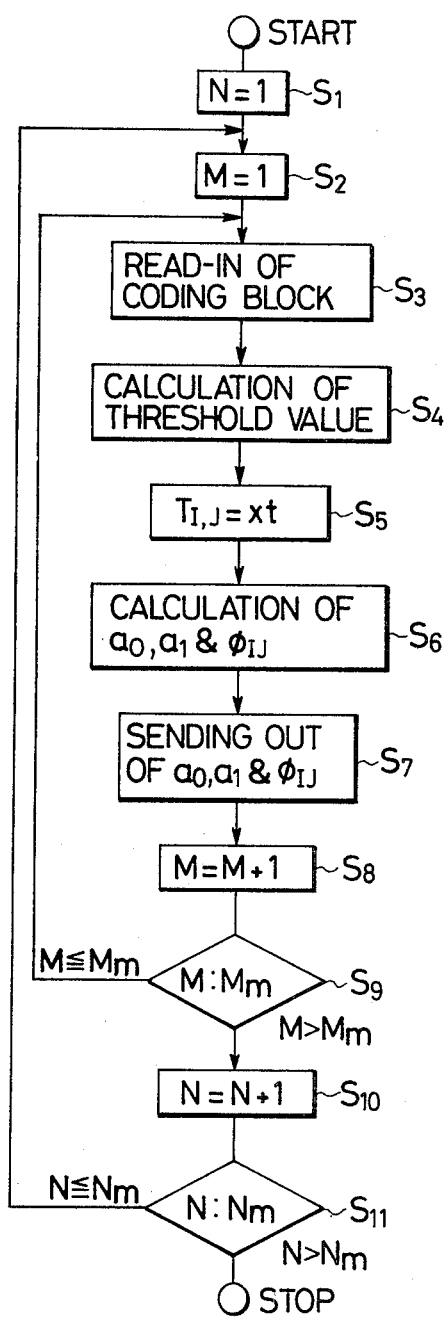
FIG. 9 is a flowchart showing the basic operations for coding.

A basic flowchart for coding is illustrated in FIG. 9. Upon starting, the content N of a row block memory is made 1 in a step $S_1$, and then the content M of a column block memory is made 1 in a step $S_2$. In a step $S_3$, picture element signals of the block designated by the contents N=1 and M=1 of the block memories are read in a temporary storage. Based on these picture element signals, the threshold value $x_t$ is calculated in a step $S_4$. In a step $S_5$, the threshold value $x_t$ is stored in a threshold memory corresponding to each picture element in the block. Next, in a step $S_6$, a resolution component $\phi_{IJ}$ is discriminated from each picture element signal $x_{IJ}$ and the threshold value $x_t$ corresponding thereto, and the gray components, that is, the typical luminance levels $a_0$ and $a_1$ are calculated. Each block is composed of picture elements of n rows and m columns, $I=1, 2, \ldots m$ and $J=1, 2, 3, \ldots n$.

In a step $S_7$, the components $a_0$, $a_1$ and $\phi_{IJ}$ are transmitted, and then in a step $S_8$, the content M of the column block memory is added with 1. In the next step $S_9$, it is checked whether the memory content M has reached its maximum value Mm or not, and in the case where the content M is larger than the maximum value Mm, the content N of the row block memory is added with 1 in a step $S_{10}$. In a step $S_{11}$, it is checked whether the content N is in excess of its maximum value Nm, and if the content N is smaller than or equal to the maximum value Nm, the operation goes back to the step $S_2$. Where the content M of the column block memory is smaller than or equal to the maximum value Mm in the step $S_9$, the operation goes to the step $S_3$. When the content N is in excess of the maximum value Nm in the step $S_{11}$, it means completion of coding of the entire frame, and the operation is stopped.

Figure 10:
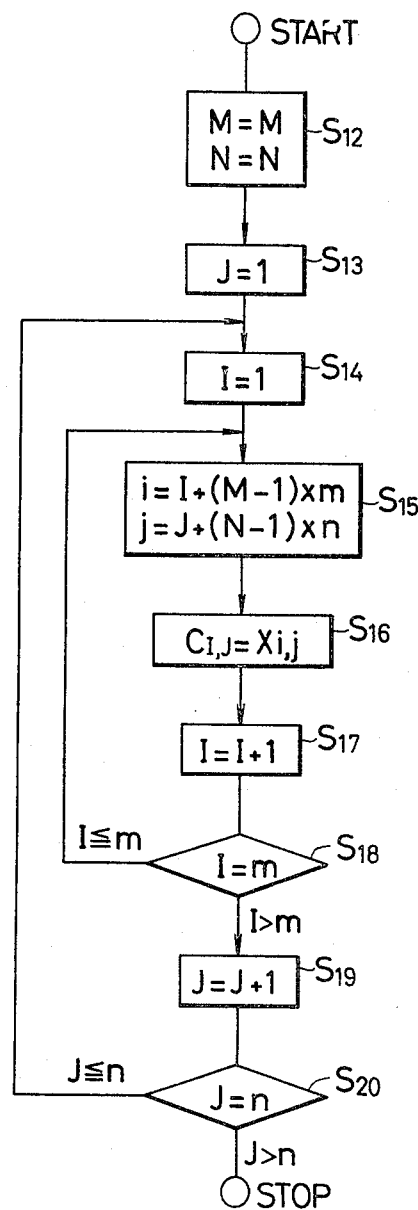
FIG. 10 is a flowchart showing a coded block read-in routine.

A coded block read-in routine in the step $S_3$ is shown, for example, in FIG. 10. At first, in a step $S_{12}$ the content M of the column block memory is set to M of block numbers M and N to be read in, and the content N of the row block memory is made N. The content J of a block row address memory which indicates that addresses J and I in the block is made 1 in a step $S_{13}$, and in a step $S_{14}$ the content I of a block column address memory is made 1. Next, in a step $S_{15}$, a calculation $I+(M-1)\times m$ of a frame row address i and a calculation $J+(N-1)\times n$ of a frame column address j are carried out. The luminance level $x_{ij}$ of picture element at the address (ij) is read out from the video memory 13 in a step $S_{16}$ and then transferred to the random access memory 49. Next, in a step $S_{17}$ the content I of the block column address memory is added with 1, and it is checked in a step $S_{18}$ whether the content I is smaller than, equal to or larger than m. Where $I \leq m$, the operation goes back to the step $S_{15}$, in which the luminance of the next picture element is read out and transferred. When $I > m$ in step $S_{18}$, the content J of the block row address memory is added with 1 in a step $S_{19}$, and the result of the addition is checked in a step $S_{20}$. Where $J \leq n$, the operation goes back to the step $S_{14}$, whereas when $J > n$ the block read-in operation is completed. In this manner, the addresses of the picture elements in each block on the frame are sequentially designated, and the picture element signals are read in a temporary storage.

Figure 11:
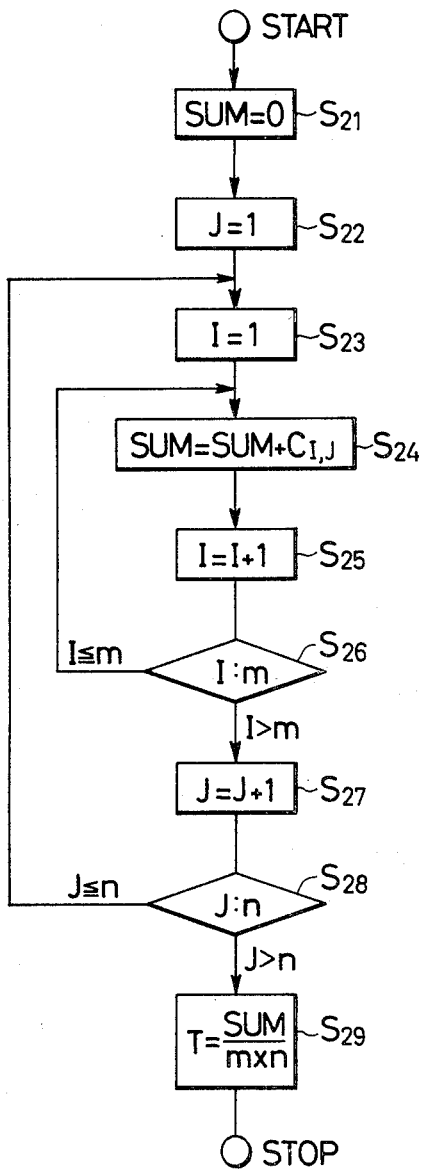
FIG. 11 is a flowchart showing a threshold value calculating routine.

A threshold value $x_t$ calculation routine in the step $S_5$ in FIG. 9 is illustrated in FIG. 11. This routine starts with making the content SUM of a summing memory zero in a step $S_{21}$. In the next step $S_{22}$, the content J of the block column address memory is made 1, and in a step $S_{23}$, the content I of the block row address memory is made 1. In a step $S_{24}$, the picture element signal $x_{IJ}$ designated by the contents I and J of the address memories is added to the content SUM of the summing memory and the added result is stored therein. Thereafter, in a step $S_{25}$, the content I of the block column address memory is added with 1 and the added result is checked in a step $S_{26}$. In the case of $I \leq m$, the operation goes back to the step $S_{24}$, in which luminance levels of the picture elements in the block are accumulated one after another. In the case of $I > m$, the operation proceeds to a step $S_{27}$, in which the content J of the block row address memory is added with 1, and the result of addition is checked in a step $S_{28}$. Where $J \leq n$, the operation goes back to the step $S_{23}$, whereas where $J > n$ the operation proceeds to a step $S_{29}$, in which the accumulated value SUM in the summing memory is divided by the number of picture elements in the block, $m \times n$, to obtain the threshold value $x_t$, which is stored in the threshold value memory.

In FIG. 12 is shown the calculation routine of the components $\phi_{IJ}$, $a_0$ and $a_1$ in the step $S_6$ in FIG. 9. At first, in a step $S_{30}$ contents $S_1$ and $S_2$ of first and second summing memories and contents $N_1$ and $N_2$ of first and second counter memories are respectively made zero. Then, in a step $S_{31}$ the content J of the block row address memory is made 1, and in a step $S_{32}$ the content I of the block column address memory is made 1. In a step $S_{33}$ the luminance $x_{IJ}$ of the picture element designated by the contents I and J of these address memories and the threshold value $x_t$ are compared with each other. In the case of $x_{IJ} < x_t$, the operation proceeds to a step $S_{34}$, in which the content $\phi_{IJ}$ of a resolution memory at the corresponding address is made 0, and in a step $S_{35}$ the content $N_1$ of the first counter memory is added with 1 and the picture element signal $x_{IJ}$ is accumulated to the content $S_1$ of the first summing memory in a step $S_{36}$. Where $x_{IJ} \geq x_t$ in the step $S_{33}$, the operation goes to a step $S_{37}$, in which the content $\phi_{IJ}$ of the resolution memory at the corresponding address is made 1, and in a step $S_{38}$ the content $N_2$ of the second counter memory is added with 1 and the content $S_2$ of the second summing memory is accumulatively added with $x_{IJ}$ in a step $S_{39}$. The step $S_{36}$ or $S_{39}$ is followed by a step $S_{40}$, in which the content I of the block column address memory is added with 1, and the result of addition is checked in a step $S_{41}$. In the case of $I \leq m$, the operation goes back to the step $S_{33}$, in which the next picture element signal is compared with the threshold value. In the case of $I > m$, the operation goes to a step $S_{42}$, in which the content J of the block row address memory is added with 1. The result of addition is checked in a step $S_{43}$, and if $J \leq n$, the operation goes back to the step $S_{32}$, and if $J > n$, the content $S_2$ of the second summing memory is divided by the content $N_2$ of the second counter memory to obtain the typical luminance level $a_1$ in a step $S_{44}$. Next, in a step $S_{45}$ the content $N_0$ of the first counter memory is checked, and when the content N is not zero, the content $S_1$ of the first summing memory is divided by the content $N_1$ of the first counter memory to obtain the typical luminance level $a_0$ in a step $S_{46}$. If $N_1 = 0$ in the step $S_{45}$, the typical luminance level $a_0$ is made equal to $a_1$ in a step $S_{47}$.

Figure 13:
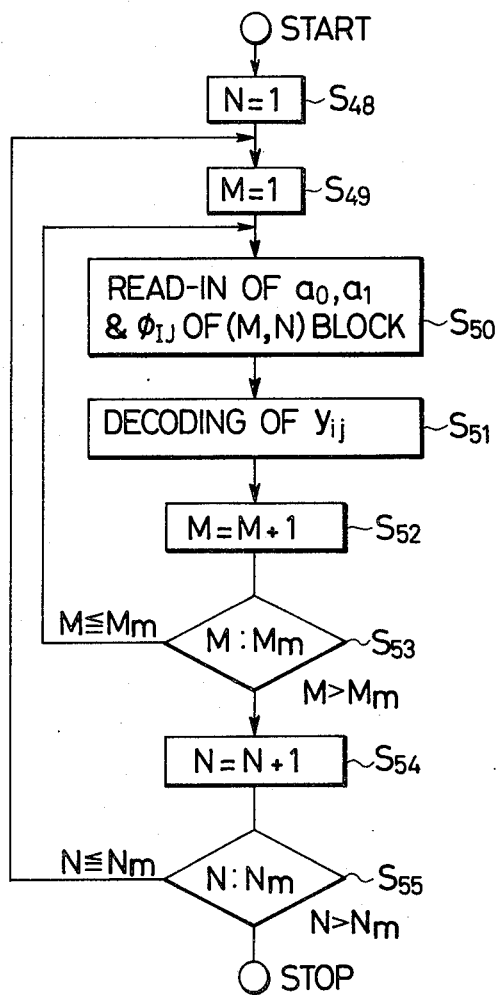
FIG. 13 is a flowchart showing the basic operation for decoding.

Turning next to FIG. 13, the decoding operation will be described. Let it be assumed that the video memory 13 in FIG. 8 has stored therein the components $a_0$, $a_1$ and $\phi_{IJ}$ of one frame. At first, in a step $S_{48}$ the content N of the row block memory is made 1, and in a step $S_{49}$ the content M of the column block memory is made 1. Then, based on the contents M and N of these block memories, the components $a_0$, $a_1$ and $\phi_{IJ}$ of each picture element in the block are read in the random access memory 49 in a step $S_{50}$. Next, in a step $S_{51}$ the components $a_0$ and $a_1$ are written as an output $y_{IJ}$ in the video memory 13 at the corresponding address depending upon whether the component $\phi_{IJ}$ is 0 or 1. In the next step $S_{52}$, the content M of the column block memory is added with 1 and its result is checked in a step $S_{53}$. Where $M \leq Mm$, the operation goes back to the step $S_{50}$, in which a code of the next block is read in a temporary storage. Where $M > Mm$, the content N of the row block memory is added with 1 in a step $S_{54}$. Then, the content N is checked in a step $S_{55}$, and if $N \leq Nm$, the operation goes back to the step $S_{49}$, and if $N > Nm$, it means completion of decoding of all picture elements and the decoding operation is stopped.

The decoding operation may also be achieved in the following manner: At first, a picture element address (ij) on the frame is determined, the components $a_0$, $a_1$ and $\phi_{ij}$ of the block to which the address (ij) belong are read out of the video memory 13, decoding of $y_{ij} = \overline{\phi_{ij}} a_0 + \phi_{ij} a_1$ is effected and the decoded output $y_{ij}$ is written in the video memory 13 at the address (ij); such a decoded output is similarly obtained in connection with each of the other addresses.

As has been described in the foregoing, according to the picture signal coding apparatus of this invention, the picture frame is divided into a plurality of blocks and, for each block, at least two gray components and resolution components for each picture element are obtained, so that the minuteness and the tone wedge property of the picture are not impaired, and in addition, since a plurality of bits are not coded for each picture element, the number of bits used is small as a whole and the coding can be made highly efficient. Further, since the coding can be achieved by addition for each picture element or division for each block, the coding can be easily executed by a stored program, using a microprocessor, and the structure therefor can be made relatively simple as compared with that formed as a wired logic. As the resolution component is a binary signal and corresponds to each picture element, coding errors do not markedly degrade the picture quality. Decoding is achieved by controlling a gate circuit with the resolution component and the structure therefor can be formed easily.

In the foregoing, the blocks are each described to be square but may also be of a triangular, rhombic or like configuration. Moreover, the foregoing embodiment uses one threshold value and two typical luminance levels $a_0$ and $a_1$, but a plurality of threshold values may also be employed. In such a case, the picture element signals of one block are each classified into any one of a plurality of level ranges defined by the plurality of threshold values to obtain the resolution component $\phi_i$. Consequently, this resolution component $\phi_i$ is represented by a plurality of bits. From this resolution component $\phi_i$, each picture element signal and the threshold values, the typical luminance levels are calculated in the respective level ranges.

What is claimed is:

1. A picture signal coding apparatus comprising:
    threshold value setting means for dividing a frame of a gray-scaled picture into a plurality of coding blocks and setting at least one threshold value for each of the coding blocks based on the brightness distribution therein;
    means for classifying the brightness level of each picture element of each coding block into any one of level ranges defined by the threshold value to obtain a resolution component;
    typical brightness level calculating means for obtaining at least two typical brightness levels from the classification result and the brightness levels of the picture elements of each coding block; and
    means for sending out codes respectively representing the resolution components and the typical brightness levels.

2. A picture signal coding apparatus according to claim 1, wherein said threshold value setting means sets one threshold value, wherein the resolution component is information composed of one bit for each picture element, and wherein the number of typical luminance levels used is two.

3. A picture signal coding apparatus according to claim 2, wherein said threshold value setting means obtains a mean value of the luminance levels of the picture elements of each block, and wherein said typical luminance level calculating means calculate mean values $a_0$ and $a_1$ of the luminance levels of the picture elements below and above the threshold value.

4. A picture signal coding apparatus according to claim 1, wherein said threshold value setting means, said resolution component obtaining means and said typical luminance level calculating means are formed with a common microprocessor.

5. A picture signal decoding apparatus adapted to be supplied, for each block constituting a portion of a gray-scaled picture, with codes representing resolution components showing whether the brightness level of each picture element is above or below a threshold value for the block, with a code representing a typical brightness level for the picture elements having levels above the threshold value in the block, and with a code representing a typical brightness level for the picture elements having levels below the threshold value in the block; said decoding apparatus comprising means for deriving from said codes the resolution components and the two typical brightness levels corresponding to the block, and means for outputting, based on the resolution components, one of the two typical brightness levels for one of the logical values of the resolution components and the other typical brightness level for the other logical value.

* * * * *